(12) United States Patent
Florell

(10) Patent No.: US 11,284,629 B2
(45) Date of Patent: Mar. 29, 2022

(54) METHOD AND APPARATUS FOR QUARTERING AND FIELD PROCESSING WILD GAME

(71) Applicant: Jamin Florell, Fort Collins, CO (US)

(72) Inventor: Jamin Florell, Fort Collins, CO (US)

( * ) Notice: Subject to any disclaimer, the term of this patent is extended or adjusted under 35 U.S.C. 154(b) by 0 days.

(21) Appl. No.: 17/106,308

(22) Filed: Nov. 30, 2020

(65) Prior Publication Data
US 2021/0161159 A1 Jun. 3, 2021

Related U.S. Application Data

(60) Provisional application No. 62/942,357, filed on Dec. 2, 2019.

(51) Int. Cl.
| | | |
|---|---|---|
| A22C 15/00 | (2006.01) | |
| F16M 11/32 | (2006.01) | |
| A01M 31/00 | (2006.01) | |
| A22B 5/16 | (2006.01) | |
| A22C 17/00 | (2006.01) | |
| A22C 17/02 | (2006.01) | |
| F16M 11/16 | (2006.01) | |

(52) U.S. Cl.
CPC ......... *A22C 15/003* (2013.01); *A01M 31/006* (2013.01); *A22B 5/16* (2013.01); *A22C 17/0093* (2013.01); *A22C 17/02* (2013.01); *F16M 11/16* (2013.01); *F16M 11/32* (2013.01)

(58) Field of Classification Search
CPC ... A22C 15/00; A22C 15/003; A22C 17/0093; A22C 17/02; A01M 31/00; A01M 31/006; A22B 5/06; F16M 11/16; F16M 11/32

USPC ......................................... 452/132, 185, 187
See application file for complete search history.

(56) References Cited

U.S. PATENT DOCUMENTS

| | | | | |
|---|---|---|---|---|
| 3,765,630 | A * | 10/1973 | Woolley | A22B 5/06 248/163.2 |
| 3,894,313 | A * | 7/1975 | Miller | A01M 31/00 452/189 |
| 4,860,404 | A * | 8/1989 | Flachs | A22B 5/06 452/187 |
| 5,009,283 | A * | 4/1991 | Prejean | A01M 31/02 182/116 |
| 7,059,956 | B1 * | 6/2006 | Summerlin | A22B 5/06 452/192 |
| 7,485,032 | B1 * | 2/2009 | Hogue | A22B 5/06 452/187 |
| 8,286,281 | B1 * | 10/2012 | Toothman | A61G 7/1015 5/81.1 R |
| 11,019,828 | B1 * | 6/2021 | Summerfield | A22B 5/06 |

* cited by examiner

*Primary Examiner* — Richard T Price, Jr.
(74) *Attorney, Agent, or Firm* — Andrus Intellectual Property Law, LLP

(57) ABSTRACT

A method and apparatus for use in the field processing of downed big game animals, without removing the entrails of the animal. The procedure may be implemented by one or more persons with the use of a multi-purpose tool that is portable, relatively light weight and suitable to fit into or on to a backpack when collapsed. The multi-purpose tool has features making it suitable for various outdoor activities; but it is especially adapted to form a sturdy tripod stand having telescoping legs and a rope locking mechanism on its head. When assembled as a tripod stand, rope is used to temporarily lift and hold each leg of the animal individually until each quarter and portion is skinned and removed from the carcass in the field.

14 Claims, 12 Drawing Sheets

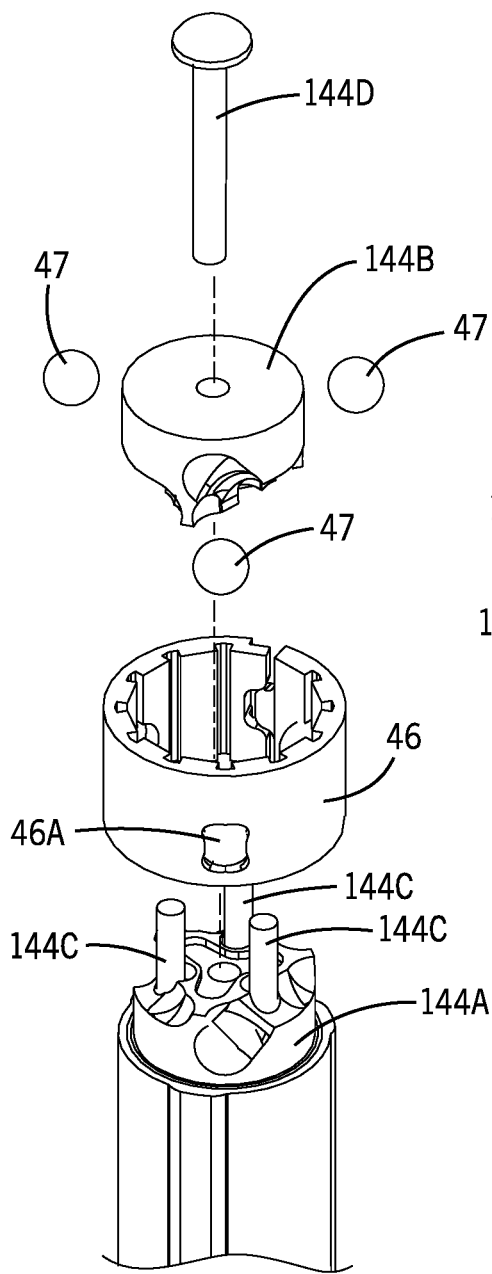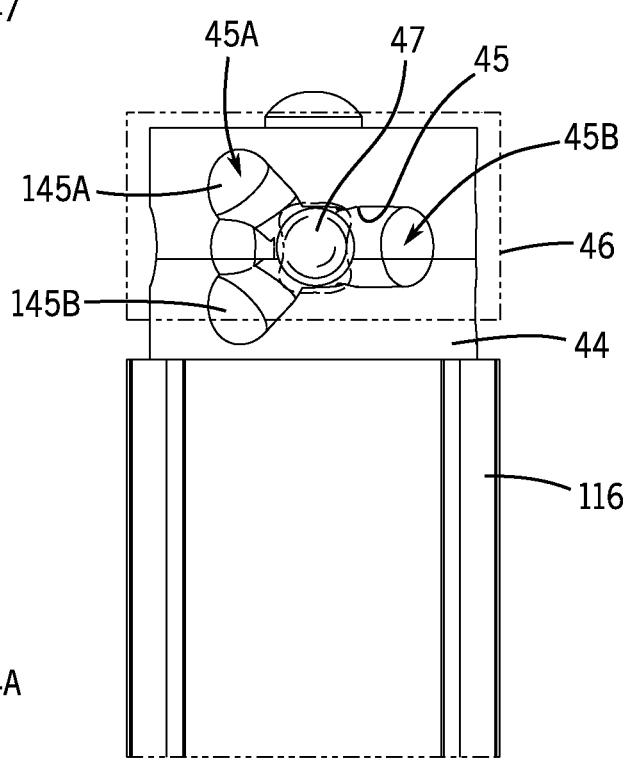
FIG. 10
FIG. 11

METHOD AND APPARATUS FOR QUARTERING AND FIELD PROCESSING WILD GAME

FIELD OF THE INVENTION

The present invention primarily relates to hunting, and more specifically to quartering and processing downed big game animals in the field. In particular, the invention relates to a method and a multi-purpose, portable apparatus for quartering a game animal in the field by lifting and holding the legs and quarters to be removed from the carcass individually, allowing this to be done by one or more persons, but not requiring disemboweling the downed game animal. The multi-purpose, portable apparatus can also be used for hiking, backpacking, camping, shooting, optical viewing, photography or as a tent stand.

BACKGROUND OF THE INVENTION

Prior art apparatus for wild game processing in the field typically describes the hoisting of the whole, intact game animal off the ground, and/or also using a mechanical method for skinning the animal (e.g. U.S. Pat. No. 7,485,032 B1 to Houge; U.S. Pat. No. 7,059,956 B1 to Summerlin; and U.S. Pat. No. 3,765,630 to Wooley). Hoisting and suspending the whole, intact animal off the ground can be difficult in the field, and hunters often resort to the use of ATVs or other vehicles to retrieve big game animal such as elk.

One object of the present invention is to provide a method of quartering and field processing big game animals without removing the entrails and without having to lift the entire carcass off the ground. After processing, the remaining carcass containing the entrails can be left at the site.

Another object of the present invention is to eliminate the need to use an ATV or other vehicle to retrieve the whole animal when quartering and field processing big game animals; thus giving a hunter the freedom and confidence to enter more remote areas such as wilderness or non-motorized areas and encouraging the hunter to butcher the animal as soon as possible after the kill.

Another object of the present invention is to provide a portable tool to aid in the quartering and butchering process in the field without the need for a tree limb or other structure for support.

Another object of the present invention is to provide a better means to aid in quartering and butchering a big game animal if the animal is downed on sloping ground.

Another object of the present invention is to provide a versatile, multi-purpose tool to be used in various activities related to the sport of hunting and outdoor recreation.

Another object of the present invention is to hold and suspend each leg of a downed game animal individually, after being removed from the carcass, while being wrapped with cellophane and/or game bag (later referred to as being "packaged") by one or more persons for storage or transportation of the desired meat, reducing the potential for contamination of the meat by contact with the ground.

Another object of the present invention is to enable quartering and butchering immediately after the kill to accelerate the cooling of the desired meat from the harvested game animal. Thus, limiting the risk of spoilage and reducing the "gamy" flavor often associated with wild game meat.

SUMMARY OF THE INVENTION

In one aspect, the present invention is a new method for quartering and field processing a game animal without removing the entrails of the animal. The method employs the use of a tripod stand and rope to lift and hold each leg quarter individually, to be skinned and removed from the carcass along with the removal of other meat portions of the game animal by a person with a hunting knife, while the remaining carcass is left on the ground still containing the entrails. Details of this method are described below.

In another aspect, the invention pertains to a multi-purpose tool that can be assembled into a tripod stand with a rope for lifting. The tool has three collapsible, telescoping legs that are removeably connected to a head. The top of each telescoping leg preferably has a cap with a formed hook that fits into a semi-open port on the head and connects to an axel rod spanning the respective port. The hook forms a slot that spans partially across the cap transversely and generally descends angularly upward towards the open end when the leg is attached to the head. The seat of the hook slot has a diameter selected to fit tightly to the respective axel rod on the head. The minimum distance across the slot, however, is slightly smaller than the diameter of the seat in order to enable the hook to snap into and out of engagement with the axel rod with a vertical twisting or rotating motion. The shape of the seat holds the respective leg cap tightly in place even when the tripod holds significant weight. The head also includes a rope locking mechanism which has a series of smooth rods and a knurled pinch pin mechanism to hold a rope from the head. The rope is used to temporarily lift the respective quarter of the downed animal in the field in the disclosed exemplary use of the tool; however, it could be used to lift or support other items or small game animals as well.

When the multi-purpose tool is assembled to form an upright tri-pod style stand, with three collapsible telescoping legs connected at their top to a pivot point head, the legs are able to pivot inward and outward of each other with the placement of the bottom of the legs independent of each other. The telescoping legs can thus be extended and adjusted to allow for the tripod to stand in an upright position on uneven terrain.

The tool when assembled as a tripod stand can also be employed as a glassing or spotting tripod by incorporating an optical mounting device on the head using a thread adapter on the head.

The tool when assembled as a tripod stand can also be employed as a shooting rest by connecting a firearm cradle rest to the head of the tool, for example via the mounting mechanism. The mounting mechanism can take several forms and can be configured to provide a specialized mounting structure for unique attachments or a more versatile structure that can be used for a wider variety of attachments. In the disclosed exemplary embodiment, the mounting mechanism comprises a threaded bolt with or without a thread adapter.

The legs of the tool can be removed from the head, extended and locked at a desired height and a separate ergonomically configured handle can be attached to the cap and/or leg tube to assist when the leg is to be employed as a hiking stick or trekking pole.

Two legs can be removed from the head, extended and assembled together with a tug belt, cargo basket, and wheel to form a wheeled travois to be pulled by a person for toting items.

In addition, with the use of a lightweight fabric material of correct proportions, the tool could be placed inside or outside this material and erected to form a tent structure for camping, emergency shelter or hunting blind.

Other objects, features and advantages of the present invention may be apparent to those skilled in the art upon reviewing the remainder of this application including the following summary, the drawings/photographs, the description of the preferred embodiment and claims.

BRIEF DESCRIPTION OF THE DRAWINGS

FIG. 10 shows a disassembled view of a locking mechanism used on the telescoping legs.

FIG. 11 is an elevational view of the exemplary locking mechanism on one of the telescoping legs.

DETAILED DESCRIPTION

Figure 1:
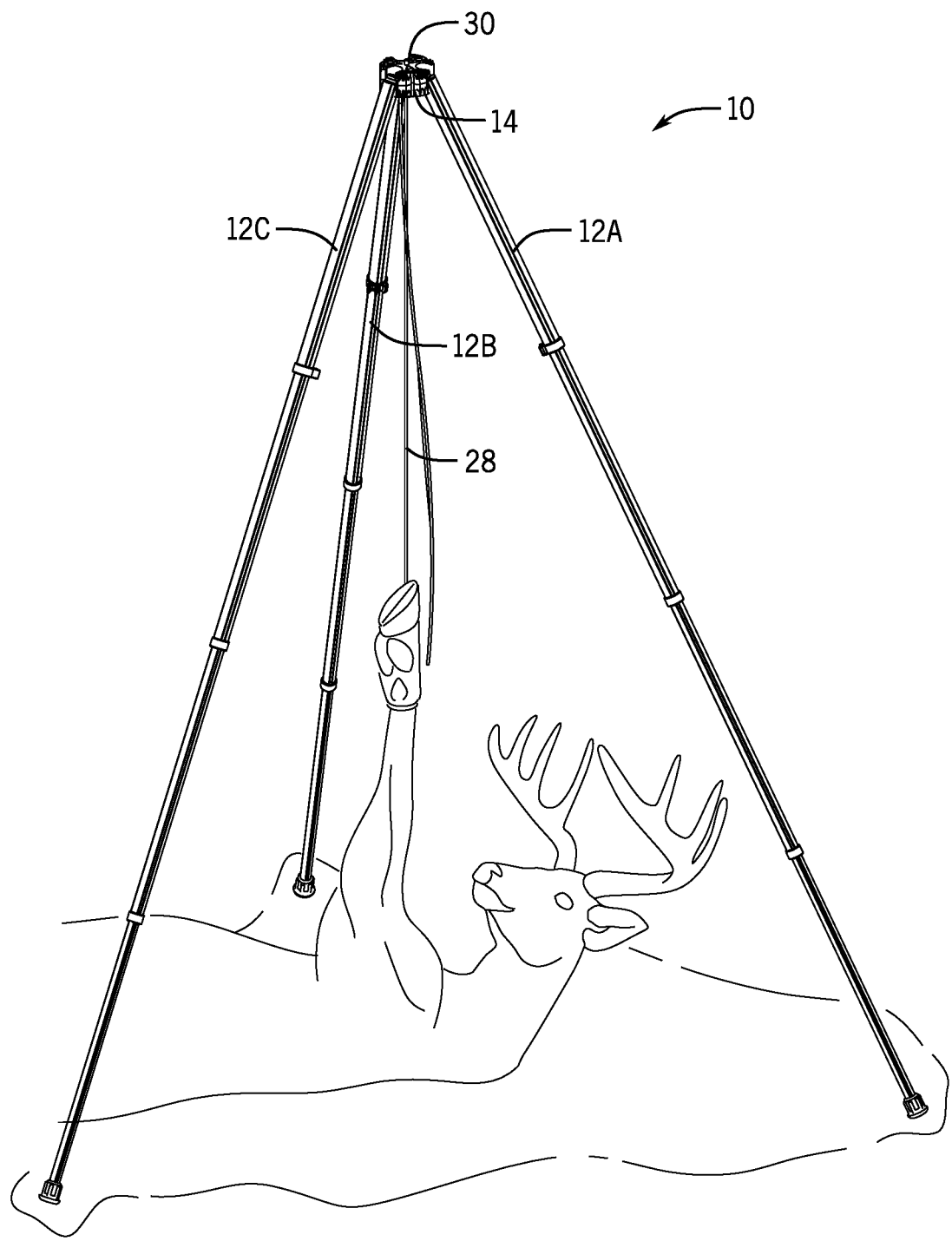
FIG. 1 illustrates the use of a multi-purpose tool constructed in accordance with an exemplary embodiment of the invention, configured as a tripod stand.

The figures illustrate a multi-purpose tool 10 that is constructed in accordance with an exemplary embodiment of the invention. As shown in FIG. 1, the multi-purpose tool 10 can be assembled to form an upright tripod style structure with three collapsible telescoping tubular legs 12A, 12B, 12C connected at their top to a pivot point head 14. The legs 12A, 12B, 12C are able to pivot inward and outward by way of axle rods 16A, 16B, 16C (see FIG. 3B) embedded within the head 14. The head 14 can be made of any suitable material having sufficient strength but is made of high-density polyethylene (HDPE) in the exemplary embodiment.

Figure 3A:
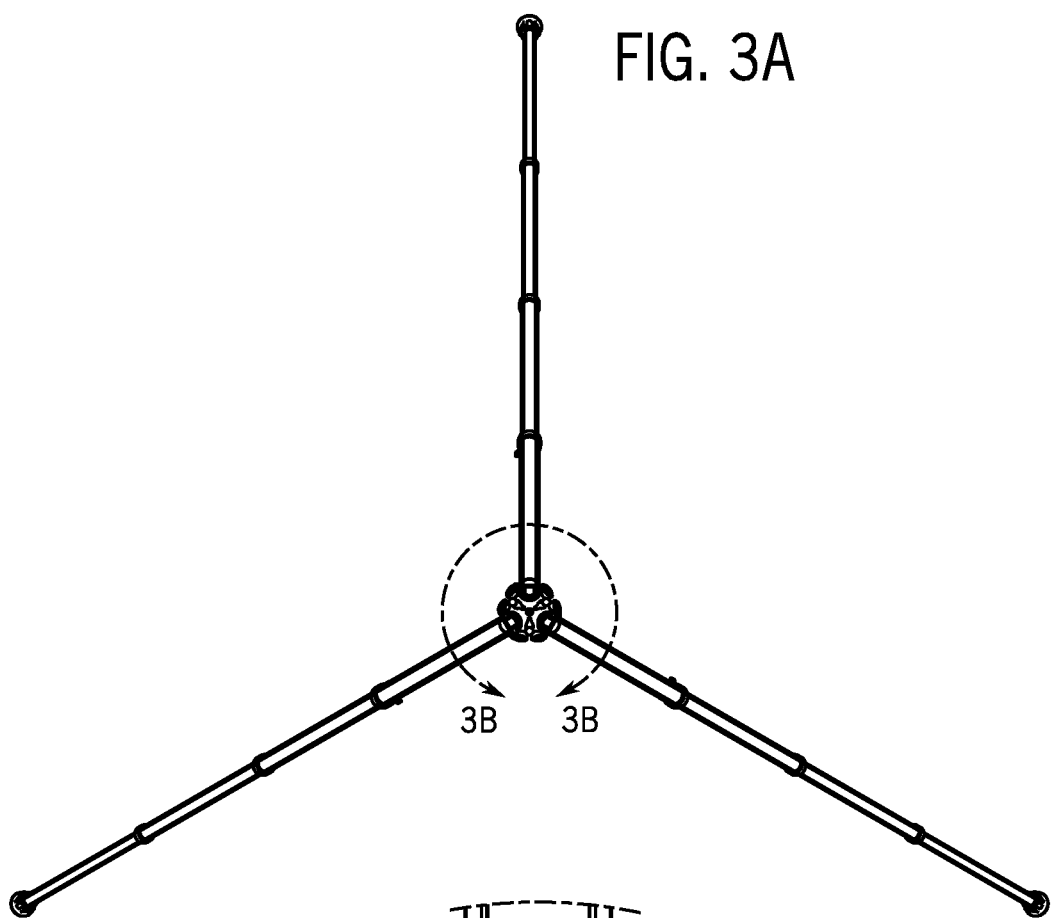
FIG. 3A is a top view of the expanded multi-purpose tool shown in FIGS. 1 and 2.
Figure 3B:
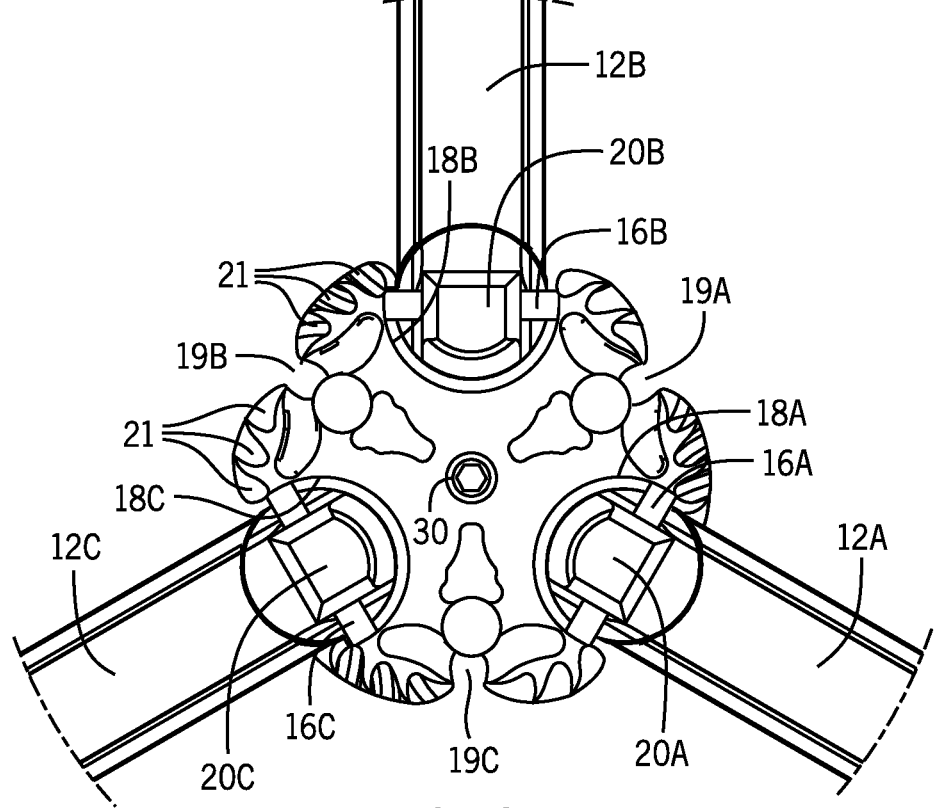
FIG. 3B is a detailed view of the area depicted by arrows 3B-3B in FIG. 3A illustrating a top view of a pivot head on the multi-purpose tool.
Figure 4A:
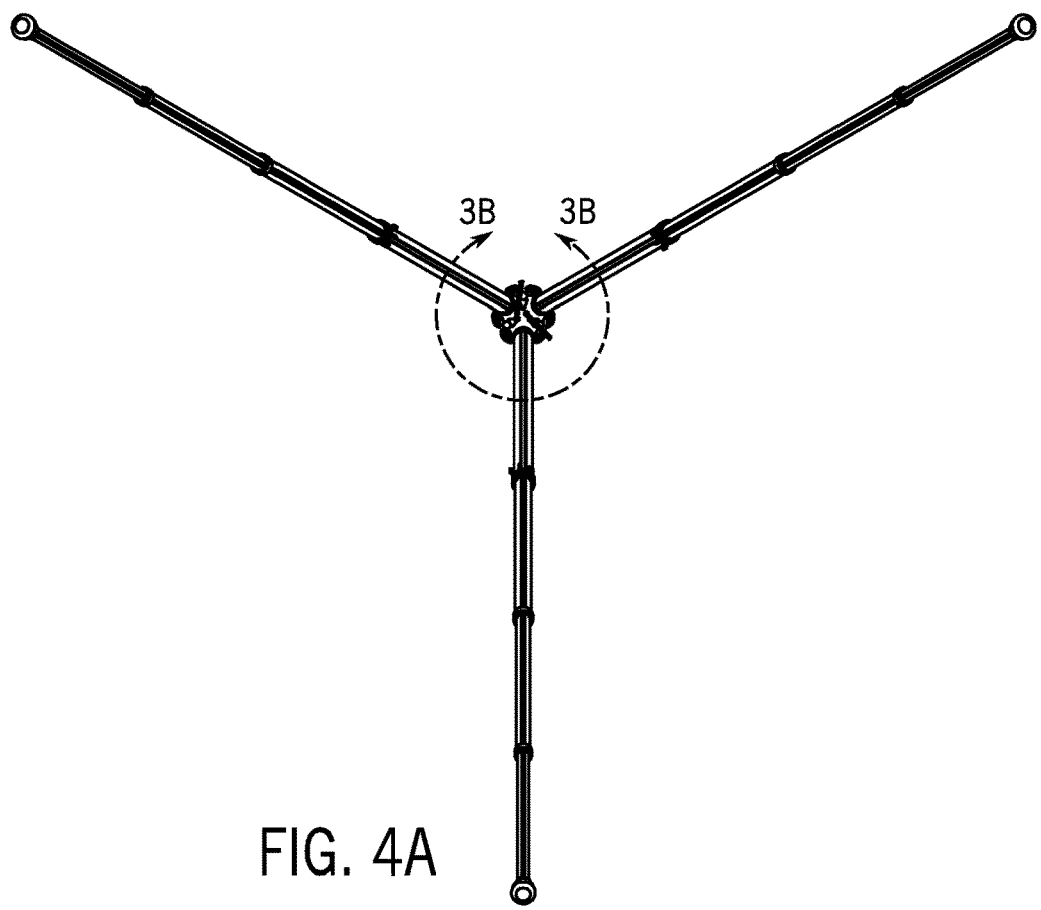
FIG. 4A is bottom view of on the multi-purpose tool shown in FIGS. 1 and 2.
Figure 4B:
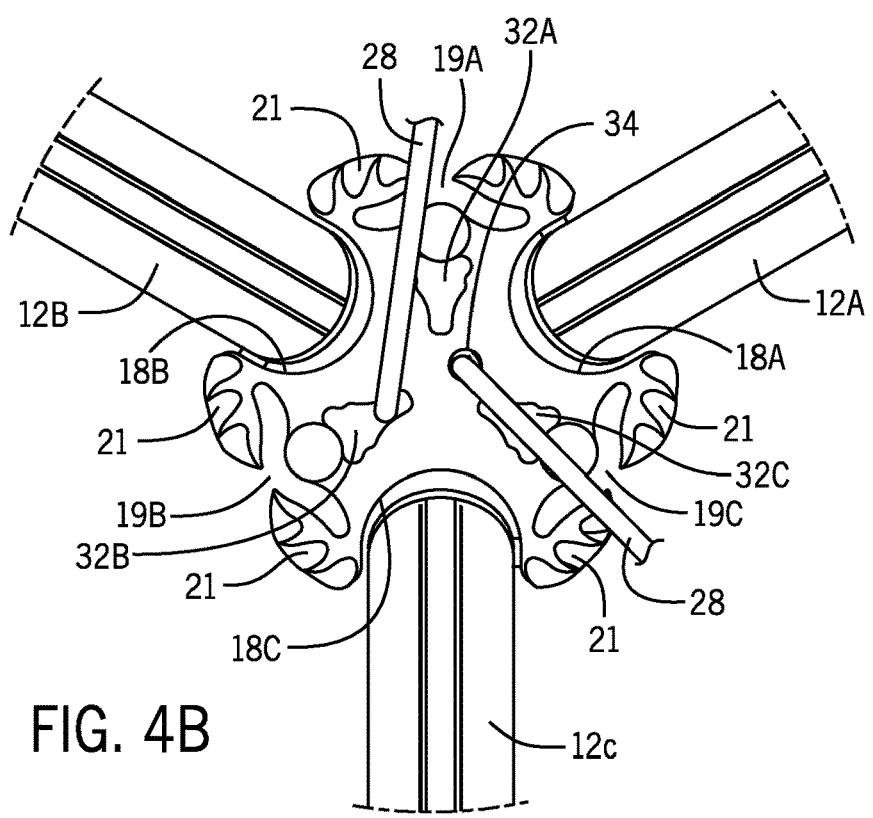
FIG. 4B is a detailed view of the area depicted by arrows 4B-4B in FIG. 4A illustrating a bottom view of a pivot head on the multi-purpose tool.
Figure 5:
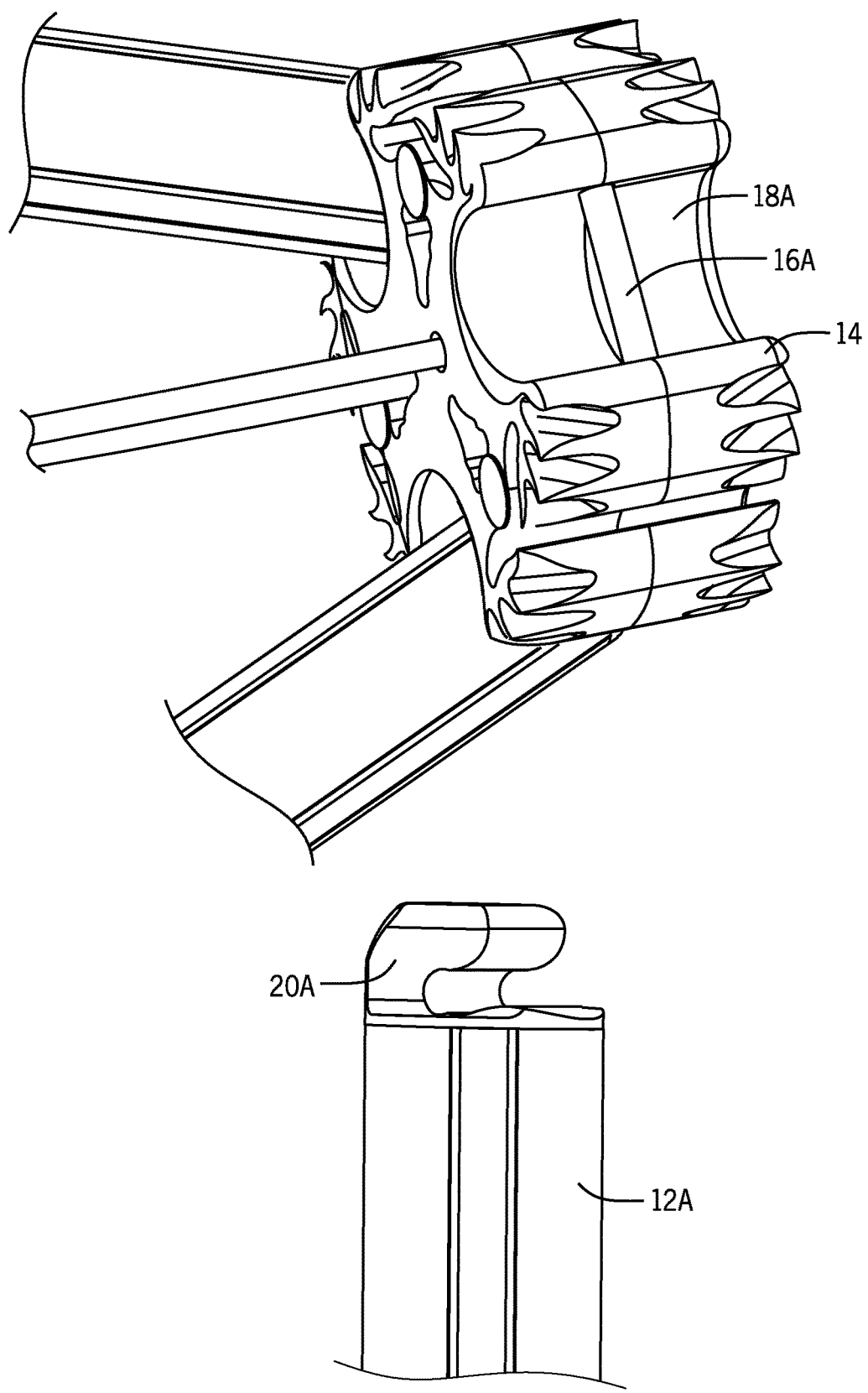
FIG. 5 shows two of the telescoping legs and the pivot point head of the tripod stand assembled and the third telescoping leg dissembled from the pivot point head of the tripod
Figure 6:
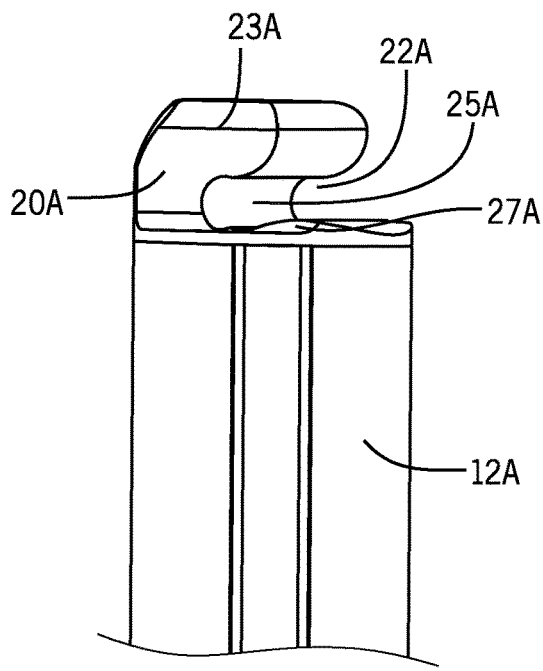
FIG. 6 is a detailed view of the hook on the cap of the leg.

Referring briefly to FIG. 3B, the head 14 has three semi-open ports 18A, 18B, 18C spaced at 120 degrees on center around the head 14, see FIG. 3B. Hooked caps 20A, 20B, 20C on the top of the three telescoping legs 12A, 12B, 12C fit around the axle rods 16A, 16B, 16C in the semi-open ports 18A, 18B, 18C. The caps 20A, 20B, 20C are desirably made of Acetal plastic or similar material. The caps 20A, 20B, 20C hook over the axle rod in the respective port 18A, 18B, 18C and the weight of the tripod maintains the desired angular orientation of the respective legs. The placement of the bottom of the three legs 12A, 12B, 12C are independent from each other. When the legs 12A, 12B, 12C are extended, the apparatus can be positioned on even or on uneven ground. Any one of the legs of the apparatus 10 can be used as a hiking stick or trekking pole by rotating any one of the three legs 180 degrees to an inverted position which removes the leg form the head. Rotating beyond 180 degrees forces the hook on the cap to slide off the axle rod, as is described in more detail below. The detached leg can be extended and locked at a desired height. An optional ergonomically proportioned handle can be attached to the hooked cap 20A and/or the respective tube body of the leg, if desired, to assist in the use as a hiking stick or trekking pole. Referring briefly to FIG. 5, the leg 12A has been removed from the head 14 by unhooking the cap 20A from the axle 16A extending across the semi-open port 18A. This is done by rotating the leg 12A upward 180 degrees to a the point where the leg 12A presses against the side of the semi-open port 18A, continued rotation beyond 180 degrees uses the leverage of the leg to release the hook on the cap 20A. A twisting action of the leg 12A can also be performed at any juncture beyond 90 degrees rotation from the head 14 to release the hook as well. Referring now to FIG. 6 as well as FIG. 5, the cap 20A includes a hook arm 23A that extends up and over the cap 20A to form a slot 22A into which the axles on the head 14 fit. The slot 22A faces slightly upward. The seat 25A of the slot 22A in the hook 23A is sized to fit tightly around the respective axle. The floor 27A of the slot 22A inclines generally downward as the floor 27A approaches the seat 25A. The minimum distance between the hook 23A and the slot floor 27A is slightly less than the diameter of the axle so that the leg 12A snaps in place. To reconnect the leg 12A to the head 14, the hook arm 23A is placed under the axle 16A, as the cap 20A is rotated downward to roughly 60 degrees, the hook 23A presses against the side of the semi-open port 18A, this forces the slot 22A over the axel 16A to the point where the floor 27A descends to the seat 25A. The completed rotation causes the leg 12A to snap into place with the axle 16A fully seated in seat 25A. The width of the hook 23A and the seat 25A are sufficient to keep the leg from rotating along its longitudinal axis.

Figure 2:
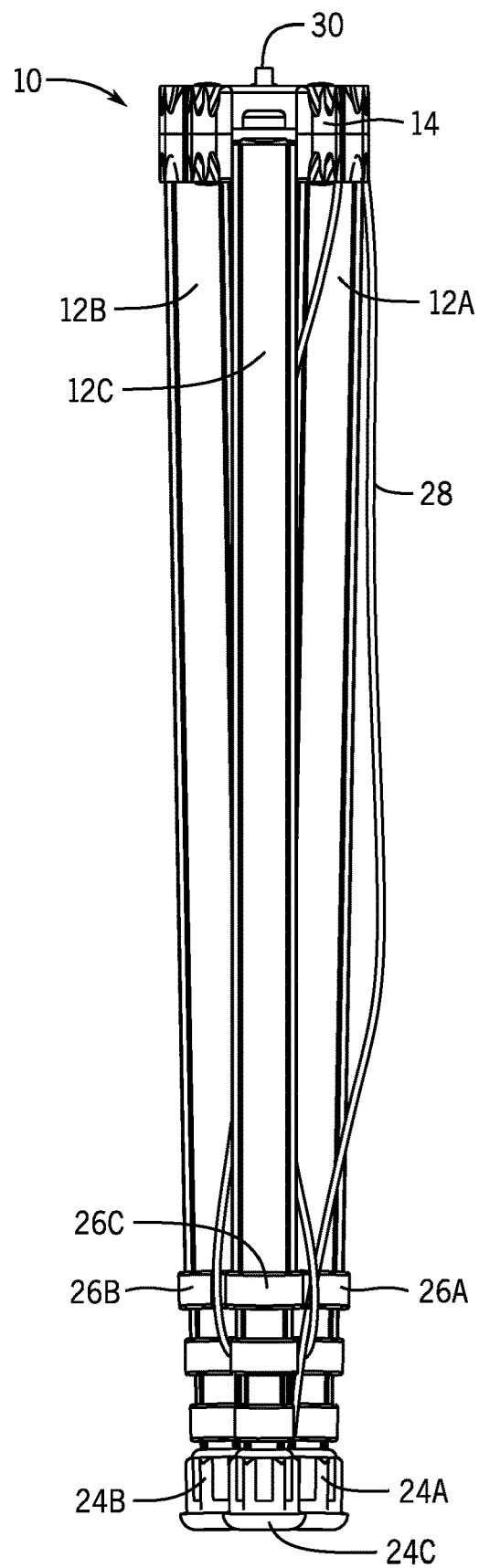
FIG. 2 is a side view of the multi-purpose tool shown in FIG. 1, in a collapsed configuration suitable for carrying in or attached to a backpack.

Referring now to FIG. 2, the legs 12A, 12B, 12C of the tool are fully retracted to facilitate carrying the tool 10. The telescoping legs 12A, 12B, 12C are extended and/or adjusted by pulling outward on the end of any one of the sections nested within the outer tube that is connected to the head 10. Some aspects of the invention can be implemented with telescoping legs having a variety of locking mechanisms, such as exterior friction clamp mechanisms, interior friction cam lock mechanisms, interior friction twist lock mechanisms, interior roller bearing wedge lock mechanisms, or a spring pin lock with adjustment holes, or the use of folding legs with a joint coupler and a central elastic shock chord are possible as well. In the exemplary embodiment shown in the Figures, the locking mechanisms are attached within the nested tube ready for actuation when a twisting action performed. As mentioned, use of telescoping legs 12A, 12B, 12C enables the length of each leg to be adjusted independently so the tripod stand 10 can stand upright even on uneven terrain. A rubber foot cap 24A, 24B, 24C is attached to the bottom of each leg 12A, 12B, 12C. The rubber foot caps 24A, 24B, 24C should be of sufficient size to keep the legs 12A, 12B, 12C from sinking far into soft ground when there is a heavy load on the tripod stand 10. Referring still to FIG. 2, when the tripod stand 10 is collapsed for storage and all three legs 12A, 12B, 12C are brought in close proximity to each other, clips 26A, 26B, 26C on the legs can be engaged to hold all three legs together while in transit.

Incorporated in the top of the head 14 is a bolt 30 for the purpose of threading on and supporting various aftermarket attachments such as a rifle cradle rest or an optical head attachment to employ the apparatus as a rifle rest, optical support or camera mount. An adapter to fit thread sizes universal to the industry can also be provided. The tool 10 can be used as a steady platform to attach a camera or spotting scope, or a steady rest to shoot a firearm.

Referring to FIGS. 3A and 3B and 4A and 4B, the head 14 in this embodiment has three bays 19A, 19B, 19C equally spaced between the semi-open ports 18A, 18B, 18C for storing the rope. These bays 19A, 19B, 19C each contain a slot to allow for a rope 28 to be weaved around and through the bays 19A, 19B, 19C within the head 14 for storage of the tail ends of the rope 28 when not in use. The outer surface 21 of the head 14 has rope hooks around the bays to facilitate wrapping of the rope for storage.

Figure 7B:
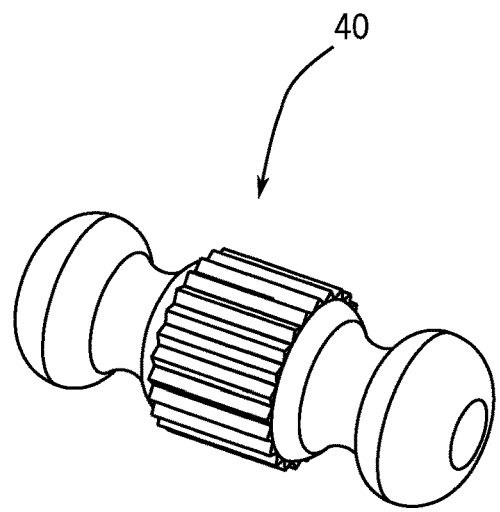
FIG. 7B shows a knurled pin used in the exemplary rope locking mechanism.
Figure 7A:
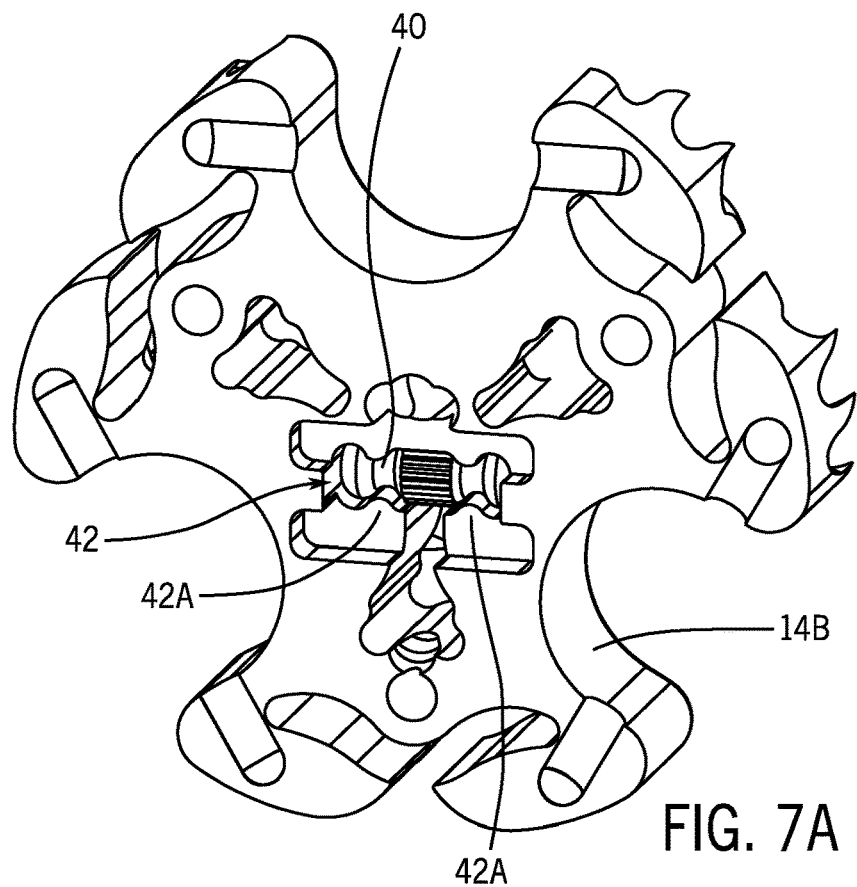
FIG. 7A is a perspective view of the lower part of the disassembled pivot point head showing components of a rope locking mechanism constructed in accordance with an exemplary embodiment of the invention.
Figure 7C:
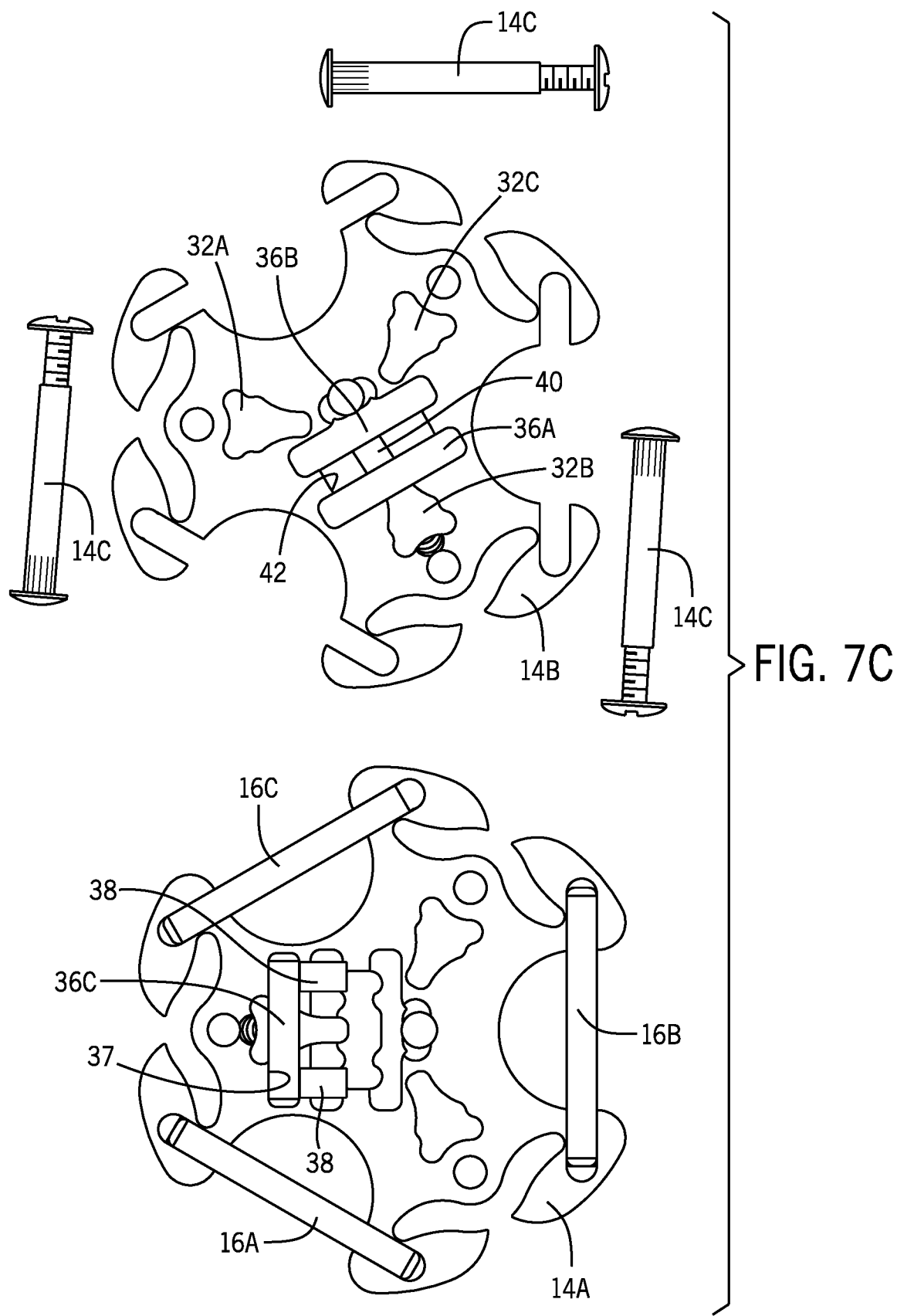
FIG. 7C shows the disassembled upper and lower parts of the exemplary pivot head.

As shown in FIG. 7C, the head 14 comprises of two pieces: a top 14A, and a bottom 14B with three fasteners 14C holding the two pieces together. Referring to FIGS. 7A through 7C in addition to FIGS. 3A, 3B, 4A and 4B, the head 14 includes voids 32A, 32B, and 32C (FIG. 4B) which pass vertically through the head 14 generally between the semi-open ports 18A, 18B, 18C. The head 14 also has a central vertical bore 34, see FIG. 4B, through which the work end of the rope 28 passes. While the work end of the rope 28 passes through the central vertical bore 34, the tail end of the rope 28 passes through the void 32B in which the rope locking mechanism is located. The rope locking mechanism comprises a series of smooth pins 36A, 36B and 36C embedded within the head 14, and a knurled rolling pinch pin mechanism 40 also embedded in the head 14. The rope 28 is allowed to be pulled through in one direction and lock but is not allowed to be pulled in the opposite direction. The components of the rope locking mechanism and its operation are shown in FIGS. 7A through 7C and in cross-sectional views in FIGS. 8A and 8B.

A metal hook or simple loop would typically be tied the work end of the rope 28 hanging vertically from the central bore 34. The tail end of the rope 28, on the other hand, is pulled through the series of smooth pins within the head 14 when weight is applied to the work end. The rope locking mechanism as shown in FIGS. 7A through 7C, and 8A and 8B comprises a series of smooth metal pins 36A and 36B that are embedded within the bottom part 14B of the head 14, and a smooth pin 36C housed inside a horizontal chamber 37 located within the top part of the head 14A. The horizontal chamber 37 includes two sections that each receive a rubber bumper 38. The smooth pin 36C rests against the rubber bumpers 38 within the chamber 37, with the bumpers 38 being located towards the center.

A knurled rolling pinch pin 40 (FIG. 7B) is located inside a vertical guide housing 42 within the bottom part of the head 14B, underneath the smooth pins 36A and 36B. It is important to configure the knurled rolling pinch pin 40 with a profile that is similar to the profile of the vertical guide housing 42. The housing 42 has two vertical guide rails 42A that the knurled pin 40 rolls against so that the knurled pin 40 will roll evenly and be parallel with the smooth embedded pin 36A that it abuts without becoming inverted. The two vertical guide rails 42A also hold the knurling on pin 40 away from the wall of housing 42, yet with enough force, are able to flex to allow the knurling on pin 40 to make contact with the opposite wall of the housing 42. This action of the vertical guide rails assists with a phenomenon that will be further discussed below.

Figure 8A:
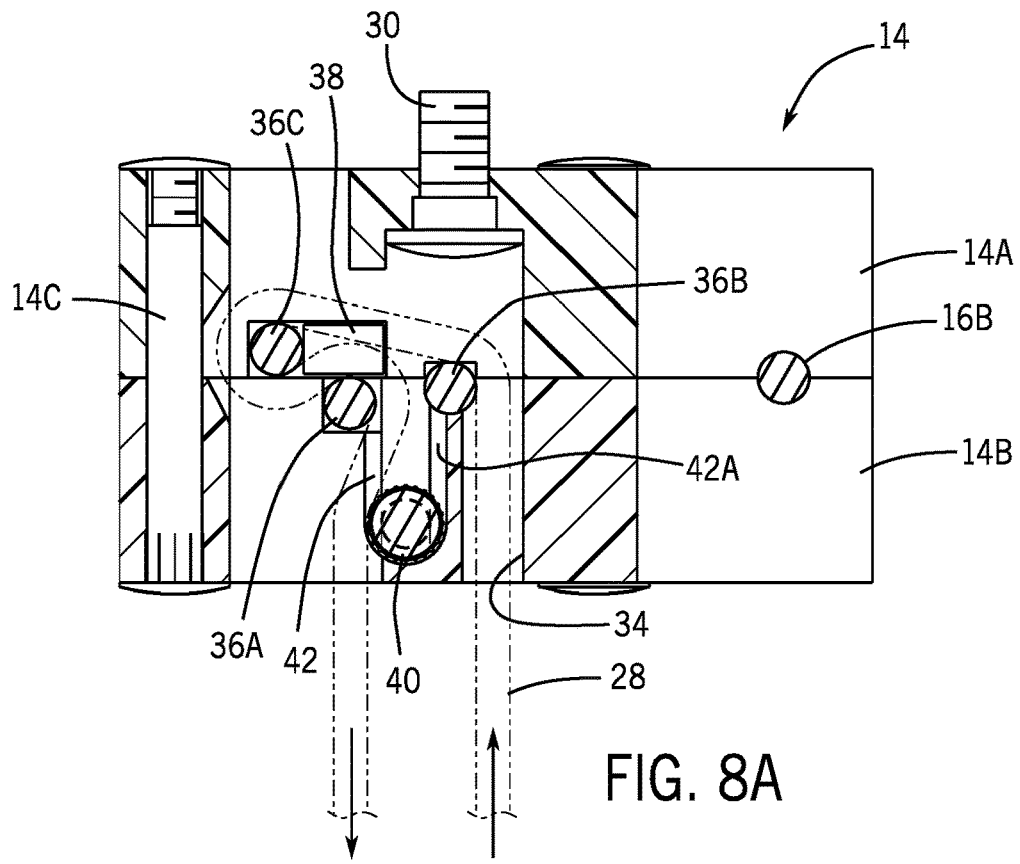
FIGS. 8A and 8B are cross sections of the pivot head assembly illustrating the components and operation of the rope locking mechanism.
Figure 8B:
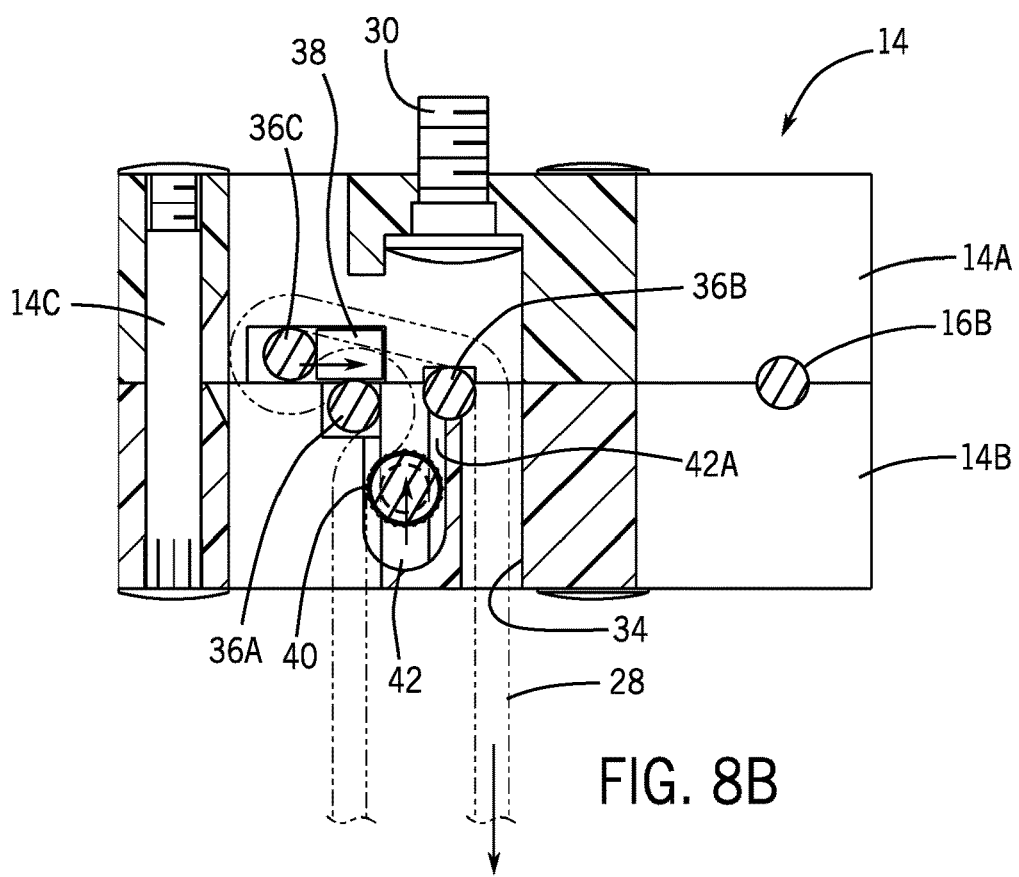

Still referring to FIGS. 8A and 8B, it is important to note that the series of smooth pins in the rope locking mechanism be strategically placed to create a serpentine pattern for the rope 28, where pins 36A and 36B are placed on top of either side of the knurled pin housing 42 with pin 36A partially intruding over the knurled pin housing 42. Pin 36B is placed slightly higher than the center of pin 36A and is placed on the opposite side of the knurled pin housing 42 and partially within the central bore 34. Pin 36C is placed above and to the left from the center of pin 36A in FIGS. 8A and 8B and further into the vertical void 32B than pin 36A. Pin 36C is held away from pin 36B by the two embedded rubber bumpers 38 yet allowed to compress the bumpers 38 and slide a short distance within its horizontal chamber 37 towards pin 36A to assist in locking the rope 28. It is important to note that the placement of pin 36A which intrudes over the knurled pin guide housing 42 be at the correct distance to cause the aforesaid phenomenon to occur.

The path of the rope 28 passes up into the vertical void 32B, into the knurled pin housing 42 over the knurled pin 40, wraps around pin 36A approximately 110 degrees, then travels under and wraps around pin 36C approximately 210 degrees. The rope 28 then passes transversely across and above pin 36A and wraps over pin 36B approximately 70 degrees and travels down through the vertical bore 34 of the bottom 14B of the head 14. A metal hook or simple loop would typically be tied to the end of the rope 28 hanging vertically from the vertical bore 34. With weight on the work or hook end of the rope 28, the tail end is pulled through the rope lock mechanism and the rope 28 becomes taunt, see FIG. 8A. In FIG. 8A, vertical guide rails 42A in the knurled pin housing 42 are keeping the knurling on the knurled pin 40 separated from the wall opposite the rope 28 in the housing 42. Continued pulling on the tail end will lift the weight applied to the hook end of the rope. With the tail end held taunt and at an angular orientation of less than thirty degrees from vertical, the rope 28 presses tight against the knurled pin 40. As this occurs, the knurled pin 40 grabs the rope 28, which rolls the knurled pin 40 upward on the two rails 42A within its guide housing 42 to a pinch point, see FIG. 8B. At the pinch point, the rope 28 is pinched between the knurled pin 40 and the smooth pin 36A causing the knurled pin 40 to flex or compress the two guide rails 42A which in turn forces the knurling on pin 40 tight against the pin housing 42 preventing the knurled pin 40 from spinning and locking the rope at this juncture. With weight continuing to be applied to the hook end while the rope 28 is pinched, pin 36C is pulled by the tension of the rope 28 toward pin 36A compressing the embedded bumpers 38 and creating a second pinch point between pin 36A and pin 36C. This second pinch point assists the initial pinch point so the knurling on the knurled rolling pinch pin 40 does not pinch the rope 28 too excessively at initial pinch point. This dual pinching action considerably reduces fraying or damage to the rope 28 from the knurling on pin 40 when pinched at the initial pinch point and prevents the rope 28 from sliding through the rope lock mechanism within the head 14 even when there is considerable weight on the hook end of the rope.

To release the rope locking mechanism, the tail end of the rope 28 is pulled downward releasing the two pinch points and allowing gravity to drop the knurled pin 40 to the bottom of its housing 42. The bumpers 38 will rebound causing pin 36C to slide away from pin 36A to free the rope 28 from the pinch points. The tail of the rope 28 can now be dropped to hang freely or be held at a 45-90 degree angle from the head 14 to completely bypass the knurled pin 40 and allow for the rope 28 to freely travel in either direction through the rope lock mechanism 36 within the head 14.

When the rope 28 hangs freely and is relaxed, the hook end can be pulled through the rope lock mechanism without the tail end held away from the knurled pin 40. While the tail end is relaxed, there is not enough pressure from the rope 28 against the knurled pin 40 to cause pin 40 to roll upward and pinch at the initial pinch point. This is due to the strategic location of pin 36A over the knurled pin guide housing 42 and the angular orientation of the rope as it approaches pin 36A. Instead the knurled pin 40 spins on the two guide rails within its housing 42 while the rope 28 glides over the knurled pin 40, and the rope 28 will not lock until enough tension is applied to the tail end. The tension on the tail end creates the required pressure against the knurled pin 40 to cause it to roll further upward along the guide rails 42A within the vertical housing 42 to the initial pinch point, which then creates enough force to flex or compress the two guide rails 42A together and allows the knurled pin 40 to press tightly against its housing 42 and lock the rope 28 from sliding through the rope lock mechanism. This ability to pull the hook end of the rope 28 without having to hold the tail end away from the knurled pin 40 is very beneficial, allowing for a hands-free operation during the use of the tool 10.

As mentioned previously, the head 14 has bays 19A, 19B, 19C equally spaced between the semi-open ports 18A, 18B, 18C and adjacent to the vertical voids 32A, 32B, 32C. These bays 19A, 19B, 19C each contain a slot for wrapping the tail end of the rope. The head 14 also has a number of rope hooks 26 on both the top 14A and bottom 14B edges of the head 14. This configuration facilitates weaving the rope 28 through the rope hooks 26, around the semi-open ports 18A, 18B, 18C and into the semi open bays 19A, 19B, 19C repeatedly for proper storage of the rope 28 when not in use.

As previously mentioned, in the exemplary embodiment, the head 14 comprises two pieces: a top 14A, and a bottom 14B with three fasteners 14C holding the two pieces together. This allows for the bolt 30, the pins 36A, 36B, 36C, the rubber bumpers 38, the knurled pin 40 and the axle rods 16A, 16B, 16C to be properly placed during the assembly process. The configuration of the rope lock mechanism in the head 14 allows for the rope 28 to be replaced without disassembling the head 14. However, if necessary, the head 14 can be disassembled relatively easily for periodic cleaning or part replacement. Some aspects of the invention can be implemented with alternative means of locking the rope. For example, the head 14 can utilize rope cleats and/or rope pinch hooks as an alternative for the rope locking mechanism 36, although this is not preferred.

In addition, aspects of the invention can be implemented with telescoping legs having a variety of locking mechanisms to prevent linear motion. In one exemplary embodiment, the telescoping legs 12A, 12B, 12C are extended and/or adjusted by a left twist, then a pulling or pushing action followed by a right twist action performed on any one of the tube sections nested within the outer tube of the telescoping legs 12A, 12B, 12C that are connected to the head 14. Though this twisting action resembles the function of a common threaded bolt or screw, there are no threads associated with the actuation in this exemplary tube locking mechanism.

Figure 9:
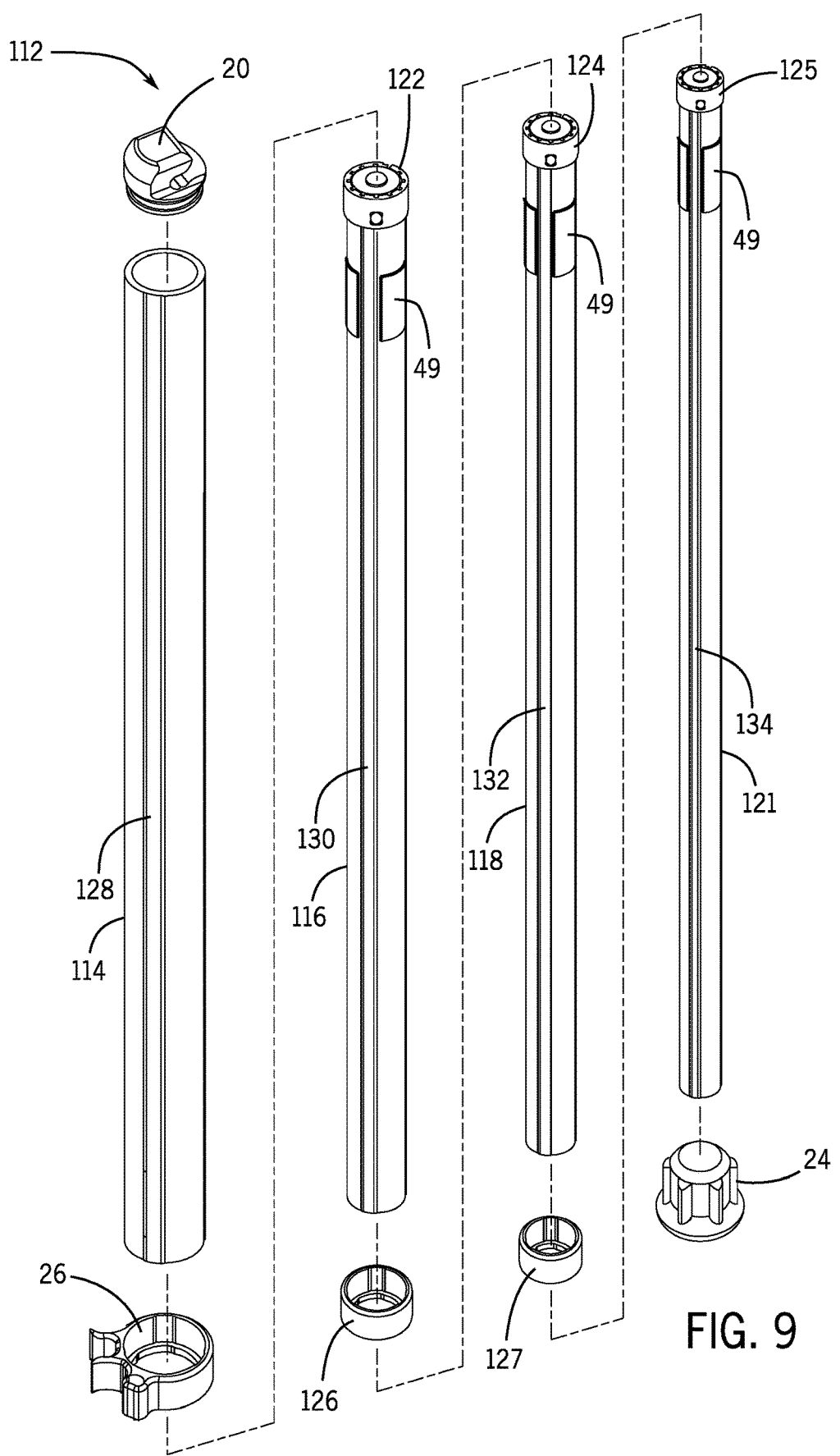
FIG. 9 shows disassembled segments of one of the telescoping legs.

Referring to FIG. 9, each telescoping leg 112 includes four segments 114, 116, 118, 121 in this exemplary embodiment. The top segment 120 includes a hook 20 as described previously to attach to the head 14 of the tripod. The top tube segment 114 has a generally circular cross section but is preferably extruded to have three longitudinal ribs 128 on its outer surface. A connector cap or tube stop 26 with a clip is attached to the bottom of the top segment 128. The second segment 116 has a slightly smaller diameter than the top segment 114 and includes a tube locking mechanism 122 to lock the position of the second segment 116 within the top segment 114. A connector cap 126 is attached to the bottom of the second tube segment 116. The third segment 118 has a slightly smaller diameter than the second segment 116 and includes a tube locking mechanism 124 to lock the position of the third segment 118 within the second segment 116. A connector cap 127 is attached to the bottom of the third tube segment 118. The bottom segment 121 has a slightly smaller diameter than the third segment 118 and includes a tube locking mechanism 125 to lock the position of the bottom segment 121 within the third segment 118. A rubber foot cap 24 is attached to the bottom of the bottom segment 121. Like the top segment 114, the other segments 116, 118 and 121 have a generally circular tubular cross-section but also have longitudinal ribs 130, 132, 134 on the outside surface, see FIG. 13C. In this configuration, the user can view the external longitudinal ribs, and verify visually that the locking mechanisms are in the locked position if the longitudinal ribs on each of the segments are aligned.

Referring to FIGS. 10 and 11, the preferred tube locking mechanism for the respective telescoping segments includes the use of a tube insert 44 (shown disassembled in FIG. 10), a slide ring 46, ball bearings 47, an inner tube stop (not shown) forming the tube lock mechanism 122, 124, 126 for the respective tube segments. The tube insert 44 is a multi-part component including a lower insert body 144A, an upper insert body 144B, rods 144C for the bump protrusions discussed below, and a screw 144D used to assemble the components as depicted in FIGS. 9 and 11. Referring to FIG. 11, the tube insert 44 contains a track 45 for the ball bearings 47, which are made of stainless steel in the exemplary embodiment of the invention although the ball bearings can be made of another suitable material such as ceramic ball bearings. The ball bearings 47 wedge between a tapered and ramped portion 45A of the ball bearing track 45 and the inner wall of a respective outer tube to lock the respective telescoping tubes from both inward and outward linear motion. The ball bearing track 45 includes a locked position 45A and an unlocked position 45B. The lower segment 116 is turned clockwise (when viewed from bottom of segment) to move the bearing 47 to the locked position 45A and lock the extended height of the lower segment 116 within the outer segment into which it is located. The lower segment is turned to counterclockwise to move the bearing 47 to the unlocked position 45B and allow the extended height of the lower segment to be adjusted.

The locked 45A position has rotational flared portions 145A, 145B to wedge the ball bearings 47 between the flared portions 145A, 145B of the track 45 and the inner wall of a respective outer tube when the tube segment 116 is rotated to the locked position. The ball bearing 47 is located in the lower flared portion 145B when the tool is set up to hold weight on the tripod, or the leg is used as a walking stick. The ball bearing 47 is located in the upper flared portion 145A when the leg is used with a pulling force on the leg. This rotational wedging action locks the respective tubes from rotating independently while a twisting action is performed. This enables all the locking mechanisms within a series of subjected telescoping tubes to lock or unlock by hand twisting only the innermost tube while the outermost tube either remains attached to the head 14 or is firmly gripped in the person's other hand. This twist-pull/push-twist action can also be performed on any one of the subjected telescoping tube segments. The respective tube segments can be adjusted to the desired length and lock each tube individually at the new desired length.

A bump protrusion (behind the ball bearing 47 FIG. 11) is located within the ball bearing track 45 and creates a "snap" effect while twisting between the locked position 45A and unlocked position 45B. The rods 144A-C shown in FIG. 10 form the respective bump protrusions. A right-hand clockwise twist to lock, or a left hand counterclockwise twist to unlock, overcomes the resistance caused by the ball bearings 47 rolling over the bump protrusion 144C. In the exemplary embodiment, the bump protrusion 144C is made of a flexible plastic rod embedded transversely across the track 45 of the tube insert 44. As the ball bearing 47 rolls over the protruding rod 144C, the rod 144C flexes inward away from the respective outer tube wall. This creates the felt resistance or "snap" effect during twisting to lock or unlock the lock mechanism. The inward flexing of the three protruding rods 144C absorbs the pressures created from the temporary wedging of the ball bearings 47 between the tube insert 44 and the outer tube wall that otherwise could dent the outer tube and allows for a more consistent feel of actuation.

As mentioned, the bearing track 45 has tapered portions 145A, 145B in the locked position 45A that extend above and below the horizontal axis of the ball bearing track 45. As linear motion is applied in either direction, the ball bearings 47 roll into these tapered portions 145A, 145B and are forced to wedge between the tube insert 44 and the tube wall thus preventing both inward and outward linear motion while in the locked position 45A. These tapered portions 145A, 145B are ramped angularly toward the bump protrusion 144C which upon counterclockwise rotation forces the ball bearings 47 to automatically find the center of their respective tracks 45 back to the unlocked position 44B. The unlocked position 44B has a cavity portion that allows the ball bearings 47 to recess away from touching the subjected tube wall upon linear motion into the unlocked position 45B.

Figure 13A:
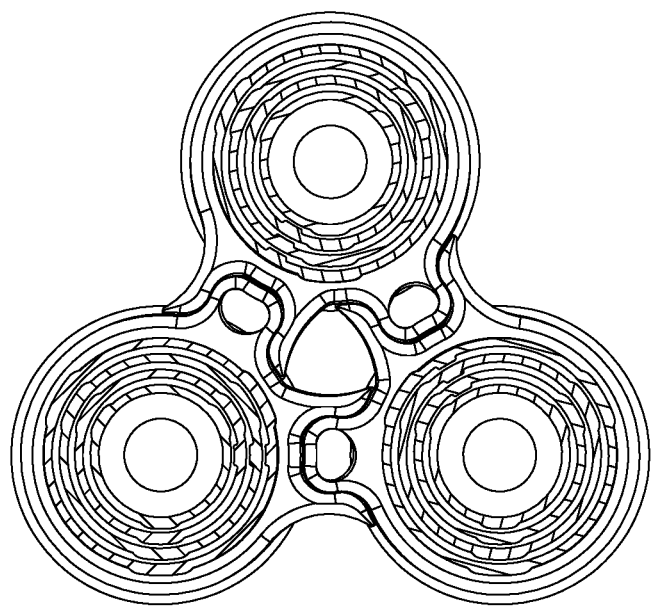
FIGS. 13A through 13C are cross-sectional views illustrating the various telescoping segments in the legs of the exemplary embodiment.
Figure 13B:
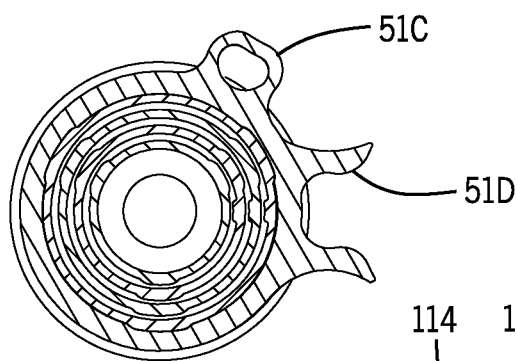
Figure 13C:
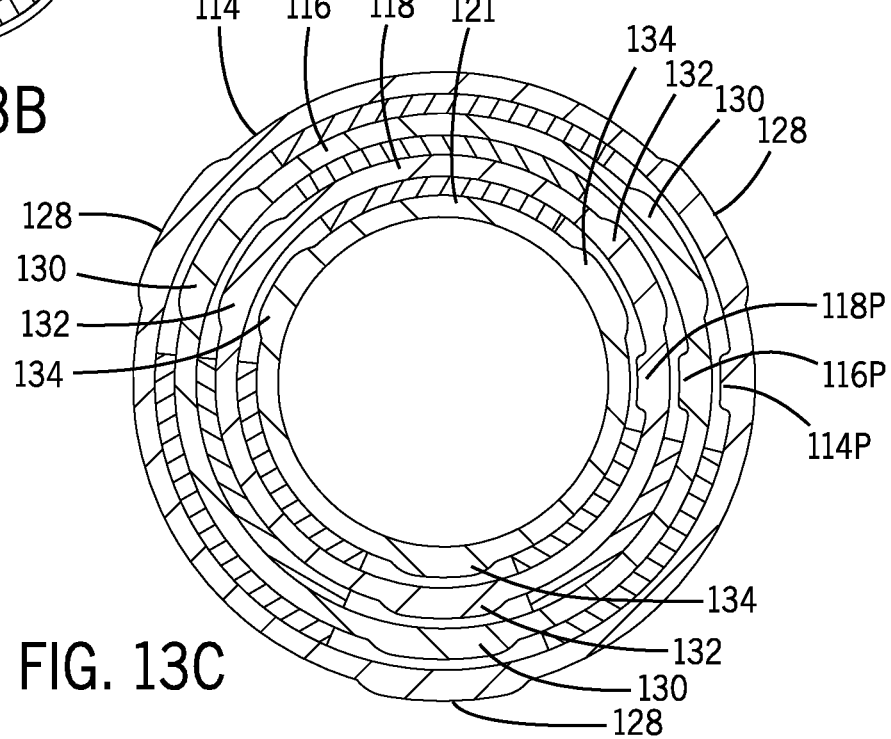

The purpose of the slide ring 46 is to contain the ball bearings 47 uniformly to match the track 45 on the tube insert 44. The slide ring has pockets 46A to hold each ball bearing 47. The slide ring 46 equally assists the ball bearings 47 into the locked 45A and unlock 45B positions. Each pocket 46A within the slide ring 46 has pressure flaps that maintain a continuous pressure against the ball bearings 47 and prevent the ball bearings 47 from scraping against the inner wall of the outer tube during linear motion of the telescoping tubes while in the unlock position 45B. Each locking mechanism should contain three or more ball bearings 47 along with their respective tracks 45 on the tube insert 44 to perform correctly and provide ample locking force. Three or more ball bearings also provides a self-centering locking mechanism. Referring to FIG. 13C, an interior longitudinal rib 114P, 116P, 118P extends along the length of each of the three outermost tube segments 114, 116, 118. The purpose of these interior longitudinal ribs 114P, 116P, 118P is to engage the slide ring 46 on the locking mechanism 122, 124, 125 of the respective inner tube segments 122, 124, 125. The slide ring 46 should have an indent to accommodate the interior longitudinal rib. The interior longitudinal rib 114P, 116P, 118P prevents the respective slide ring 46 from rotating within the outer tubes segments 114P, 116P, 118P having the interior longitudinal ribs. Desirably, the angle of the slide ring 46 is chosen so that the ball bearing pockets 46A are in alignment with exterior longitudinal ribs 128, 130, 132 on the outer tube segment 114, 116, 118, which provides additional strength when in the locked position. FIG. 13 C shows the segments 116, 118, 121 rotated into the locked position, with each of the outer longitudinal ribs 128, 130, 132, 134 in alignment. This alignment enables the user to visually detect whether the respective tube segments are in a locked position. In the exemplary embodiment, each inner tube segment 116, 118, 121 is rotated about 30 degrees to be in the fully unlocked position.

The inner tube stops 49 (FIG. 9) are provided on the outer diameter of a respective inner tube segments 122, 124, 125. In the exemplary embodiment, adhesive UHMW polyethylene tape adhered to the outside of the respective inner tube segment. The inner tube stop takes up a majority of the inter space between two respective tubes and acts as a bushing between the tubes. The tube stop also makes contact with the respective connector cap 26, 126, 127, see FIG. 9, upon full extension of the respective tube segments to prevent the tube segments from separating.

Figure 12A:
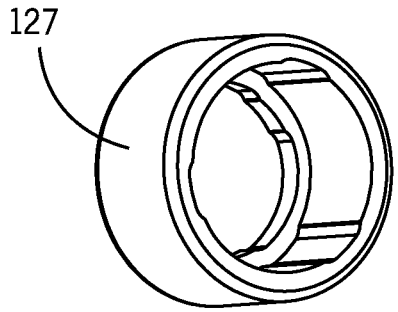
FIGS. 12A through 12F show perspective and cross-sectional views of the end caps on the telescoping legs in the exemplary embodiment.
Figure 12D:
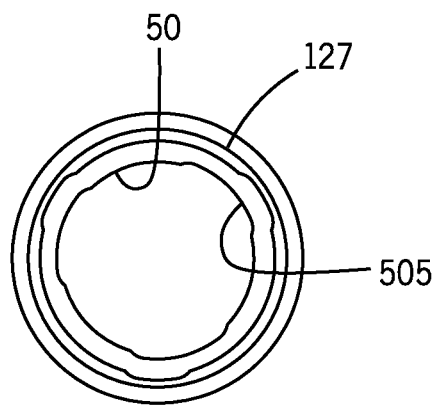
Figure 12B:
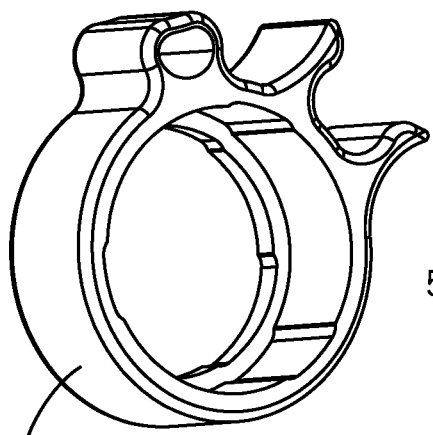
Figure 12E:
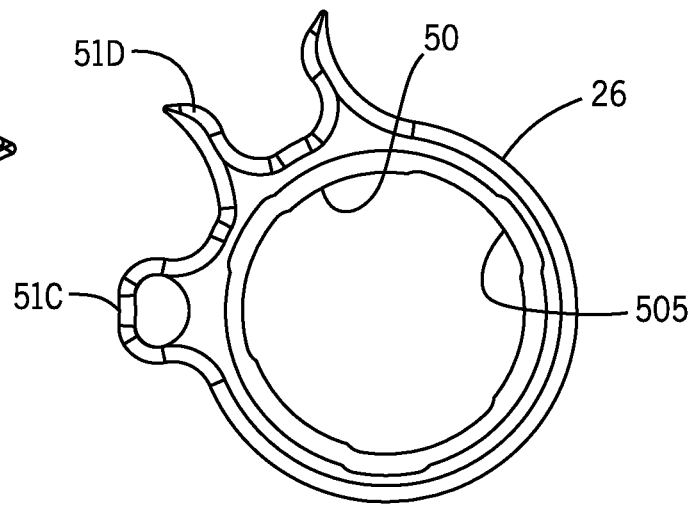
Figure 12C:
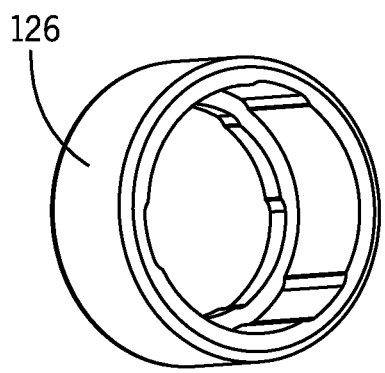
Figure 12F:
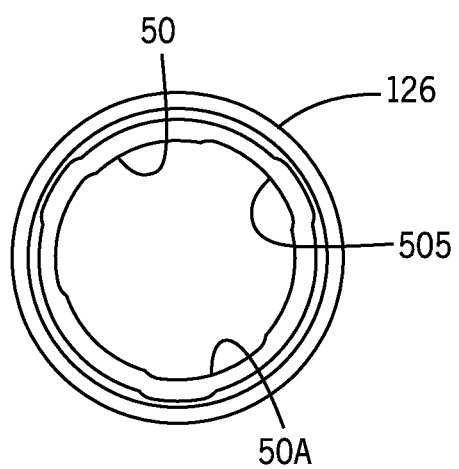

The connector caps 26, 126, 127 complete the connection of respective tube segments within the series of telescoping tube segments for each leg 12A, 12B, 12C of the multi-purpose tool 10. Each connector cap 26, 126, 127 is affixed over the larger outer tube within a series of telescoping tubing. A through-hole 50 in the respective connector cap 26, 126, 127 is made to fit snugly around the smaller inner tube keeping the smaller tube centered within the larger tube. This through-hole 50A has slots 50S to allow air to flow freely in or out of the series of tube segments during operation of the respective telescoping tubes. These slots 50B are also preferably formed and positioned to match the outer profile of the inner tube segments, namely, to accommodate proper rotation of the longitudinal ribs 130, 132, 134 on inner tube segments 122, 124, 125 (see FIG. 9) when the inner tube segment is twisted to activate or deactivate the respective tube locking mechanism. The profile of the slots 50B can also act as a rotational stop point once the locking mechanism is in the locked or unlocked position. The upper sidewalls of the connector caps 26, 126, 127 as shown in FIGS. 12A through 12C, are preferably fitted to engage over the lower end of the longitudinal exterior rib of the tube segment to which it is attached. This engagement over the respective rib 128, 130 and 132 maintains the rotational position of the connector cap 26, 126, 127 on the respective tube segment 114, 116, 118.

Referring now to FIGS. 2, 12E, 13A and 13B, when the tripod stand 10 is collapsed for storage and all three legs 12A, 12B, 12C are brought in close proximity to each other, dual element snap fastening arrangements on the largest connector caps 26 can be used to hold the legs together. A stud 51C and socket or popper 51D are strategically placed on the outer circumference of each large connector cap 26. Each stud 51C can inter-engage with a respective popper 50D on the large connector cap 26 of the adjacent leg. All three legs can be connected together in this way for storage and transit. The arrangement holds the legs 12A, 12B, 12C together until enough pressure is exerted between the legs to "pop" the legs apart. As an alternative, the large connector caps 26 can each contain an embedded magnet on a portion of their circumference. The magnets will hold the legs together when collapsed for transit, and when extended can provide for a temporary location to place a steel hunting knife during the butchering process of a downed game animal. A separate leg clip can also be provided. The clip can contain a temporary holder for a hunting knife and or other items.

The multi-purpose tool 10 as shown in the figures and described above can be used as a tripod stand 10, and for other purposes. As mentioned, the tool 10 facilitates the quartering and butchering of a big game animal in the field, in accordance with a process as described below.

To begin, immediately upon the kill of the animal such as an elk, deer, bear, moose, sheep, goat or the like, the animal is positioned on the ground lying on its side. At this point the legs 12A, 12B, 12C of the multi-purpose tool 10 are extended, pivoted apart and positioned on the ground to form a tripod stand 10 over the front shoulder of the animal. FIG. 1 shows the multi-purpose tool 10 assembled and extended to serve as a tripod stand 10, and in fact shows a later step in the process in which the leg of the animal is lifted by the rope 28. The work end (or hook end) of the rope 28 is then made to form a loop by clipping the metal hook again to the rope or building a simple loop. The loop is placed low around the front leg of the animal just above the foot. The tail end of the rope 28 is then pulled through the head 14 of the tool 10 to lift and hold the front leg of the animal up off the ground in order to facilitate the skinning of the front leg and side of the animal. After the front portion of the animal has been skinned, the front leg is lowered to lay back down on the carcass keeping the skinned leg from direct contact with the ground, and the rope 28 is removed from the foot. The tripod stand 10 is then positioned over the rear quarter of the animal and the loop in the rope 28 is placed around the rear leg of the animal just above the foot. The tail end of the rope 28 is then pulled through the head 14 to lift and hold the rear leg of the animal up off the ground in order to facilitate the skinning of the rear leg and remaining side of the animal. Once the rear quarter is skinned, the rope 28 is loosened and the work end of the rope 28 is moved to a point just above the hock of the rear leg. The tail end of the rope 28 is then pulled to help facilitate the removal of the rear quarter. The tail end of the rope 28 can be pulled periodically to lift and hold or lower and hold the rear quarter. In addition, the legs 12A, 12B, 12C of the tool 10 can be re-positioned during the process allowing the rear leg to be moved forward or back, up or down until the remaining sinew can be removed from the pelvic bone or the pelvis saw in two. Once the hind quarter is removed from the carcass, the tail end of the rope 28 can be pulled to further lift the rear quarter so that the quarter will then be freely hanging from the tripod stand 10 ready to be packaged. The quarter can then be lifted by a person, the tail end of the rope 28 pulled and held at a 45-90 degree angle from the head 14 freeing up the rolling pinch pin 40. The tail end of the rope 28 can then be dropped to hang freely and the work end of the rope 28 holding the leg can be lowered. The rope 28 is removed from the leg of the animal, and the quarter is then placed on the ground in a shaded area and protected from ground contamination.

The tripod stand 10 is then positioned again over the front quarter of the animal and the process is repeated by placing the work end of the rope 28 around the leg just above the knee. The tail of the rope 28 is then pulled to lift and hold the front leg up off the ground. Again, using a hunting knife, the front quarter is removed by cutting the sinew away from the sternum exposing the rib cage periodically pulling on the tail end of the rope 28 to help lift and hold or lower and hold the front leg. The legs 12A, 12B, 12C of the tool 10 can be re-positioned during the process, as mentioned previously, to help hold the front leg forward or back, up or down until removing all the meat from the side of the rib cage and exposing the sirloin and top of the back bone. (Note: there is no socket or bone joint connecting the front quarter to the carcass. Also, if the optional method described below for removing the ribs is not implemented, then the front quarter should be separated from the rib cage at the arm pit and under the scapula and not from the sternum exposing the ribs.) Once the front quarter is removed from the carcass, the tail end of the rope 28 is pulled to lift the front quarter so that it will be freely hanging from the tripod stand 10 ready to be packaged. The front quarter can then be lifted by the person, and the tail end of the rope pulled and held at a 45-90 degree angle from the head 14 freeing up the rolling pinch pin 40. The tail end of the rope can then be dropped and the work end of the rope 28 holding the leg can be lowered, the rope unhooked from the leg, and the front quarter can then be placed on the ground in a shaded area protected from ground contamination.

The tripod stand 10 can then be positioned away from the animal leaving about 4 feet of the work end of the rope hanging. The sirloin can be removed from the spine using a hunting knife. Once removed, the sirloin can be folded in half. Using the rope 28 hanging from the head 14 on the tripod stand 10, the sirloin can be hung over the rope, and the loop on the end of the rope can be hooked over the bolt 30 in the top of the head 14 leaving the sirloin hanging folded and for packaging. The rope 28 can be unhooked and slipped out from the fold in the sirloin while packaging.

The animal is then rolled over by the person to expose the opposite side of the animal to where the method is repeated using the same tool 10 for the removal of the remaining two quarters and sirloin of the game animal. Once the remaining two quarters and sirloin have been removed, the tenderloins can be removed from the carcass. The tenderloin is located in a cavity under the spine yet outside of the gut lining, between the rib cage and the hip. Though these meat portions are small, the tripod stand 10 can assist in removing the ready tenderloins by placing the tool 10 over the rear half of the carcass, hooking the work end of the rope 28 around the hip bones. The tail end of the rope 28 is pulled elevating and holding up the rear portion of the remaining carcass allowing the entrails and excessive blood to be forced by gravity into the front of the chest cavity relieving pressure against the tenderloins and elevating the rear portion of the remaining carcass for easier removal. If excess bloating has occurred, with a hunting knife, a hole can be made in the abdomen behind the last rib releasing the excess air from the abdomen. This procedure will allow for easier removal of the tenderloins. The hunting knife must be cleaned after this procedure. Once the excess air is gone, the tenderloin can be removed by cutting the flank portion of the abdomen away from the hip bone and finding the separation between the intestinal lining and the tenderloin. Delicate incisions are made by cutting the tendons connecting the intestinal lining to expose this separation. (Extreme care should be taken at this point not to puncture the intestinal lining causing any intestinal fluids to permeate the tenderloin, tainting the much desired meat.) The separation is then made to expose the underside of the spine. With the hunting knife, the sinew is then cut along the underside of each vertebra to the spine until the tenderloin is loosened from the spine. The tenderloin can then be removed from the carcass, packaged and placed on the ground in a shaded area. Once the tenderloins are removed, the work end of the rope 28 holding the hip bone can be lowered, the rope unhooked from the hip bone, the remaining carcass is left on the ground still containing the entrails.

If desired, or if lawful regulations require, the rib cage can be removed from the carcass at the same time the front quarter is removed (described above) and using the following procedure. Alternatively, the rib cage can be removed separately from the front quarter using the tool 10. Doing this optional procedure will expose the thoracic cavity containing the vital organs, but not the abdominal cavity containing the entrails. To begin the optional method, the rib bones are separated or sawed away from the sternum as well as the spine vertebra leaving the rearward most rib attached to the spine and the sternum. With the remaining carcass on its side, place the tool 10 over the front portion of the remaining carcass, the hook end can be fed through a cut around the frontal most rib and hooked or tied to itself. The tail end of the rope 28 can then be pulled through the head 14 lifting the rib cage away from the carcass where the rearward most rib can be cut away from the rib cage and left attached to the diaphragm and the remaining carcass. The rib cage will be free from the carcass and can be packaged and placed on the ground in a shaded area. The tool 10 can be set aside and the heart can be removed and kept for consumption if desired. The carcass is then rolled over and the process is repeated to remove the remaining side of the rib cage. Once both sides of the rib cage are removed, the abdominal cavity can then be opened and the liver can be removed for consumption if desired.

It is understood that the above description is of an exemplary embodiment of the invention, and various modifications and alternative embodiments are possible without departing from the spirit of the invention. For example, the multi-purpose tool can be used to quarter an animal that already has its entrails removed. Or, the multi-purpose tool can have more than three legs. In addition, the legs attached to the head of the multi-purpose tool can be permanent and not detachable.

Still further, the head of the multi-purpose tool can include a light and battery storage for use after dark. And, the rope locking mechanism within the head can have more than three smooth pins to create a serpentine pattern for the rope, or the rope lock mechanism can pivot to pinch the rope. It may be desirable for the rope used within the head to be coated or made of a composite material that will not absorb moisture. In an alternative method of manufacture the head 14 can be molded as one piece. The bolt adapter 30 or the axle rods 16A, 16B, 16C can be properly held in place during the molding process. The rope locking mechanism 36 can be of its own component and used separately yet can attach to the head 14.

These and other alternatives should be considered to be within the scope of the following claims.

What is claimed is:

1. A multi-purpose tool that can be assembled into a tripod stand with a rope for lifting, the tool comprising:
    a head having at least three semi-open ports spaced in a plane equally around the head;
    at least three collapsible, telescoping legs that are removable connected to a head;
    a cap having a hook on the top of each of the telescoping legs, where the hook is generally transverse to the longitudinal axis of the respective leg;
    an axle rod spanning across each of the respective semi-open ports, wherein a respective leg can be removably attached to the head by fitting the hook of the respective cap over the axel rod and rotating the leg downward so that the open end of the hook faces outward; and
    a rope connected to the head.

2. The multi-purpose tool recited in claim 1 further comprising a rope lock mechanism on the head.

3. The multi-purpose tool recited in claim 2 wherein the rope lock mechanism comprises a series of smooth rods and a knurled pinch pin mechanism located in a vertical chamber within the head to form a first pinch point to releasably lock in place the rope passing through the head.

4. The multi-purpose tool recited in claim 3 wherein the rope lock mechanism further comprises a third smooth rod held in place above the series of smooth rods and the knurled pinch pin, said third smooth rod being held in place by at least one elastomeric bumper and forming a second pinch point on the rope to relieve pressure on the first pinch point.

5. The multi-purpose tool recited in claim 2 wherein the head further comprises slotted bays placed between the respective semi-open ports for storing the rope when not in use.

6. The multi-purpose tool recited in claim 1 further comprising a mounting bolt extending vertically upward from the top surface of the head.

7. The multi-purpose tool recited in claim 1 further comprising an adaptor for a universal mount for the top surface of the head.

8. A method of quartering and butchering a downed game animal in the field comprising the steps of:
    a) providing the multi-purpose tool as recited in claim 1;
    a) assembling the multi-purpose tool in to a tripod stand with a rope for lifting;
    b) placing the downed animal on a first side;
    c) placing the assembled tripod over a front quarter of the exposed side and securing the rope to lift the exposed front quarter;
    d) using a hunting knife to skin the front leg;
    e) placing the assembled tripod over a rear quarter of the exposed side and securing the rope to lift the exposed rear quarter;
    f) using a hunting knife and/or saw to skin the side and the rear leg and remove the rear quarter;
    g) pulling on the rope to lift the rear quarter free of the downed animal;
    h) packaging the rear quarter;
    i) placing the assembled tripod over the front quarter and securing the rope again;
    j) using a hunting knife and/or saw to remover the front quarter along with the ribs if so desired;
    k) pulling on the rope to lift the front quarter free of the downed animal;
    l) packaging the front quarter;
    m) butchering the remaining portion of the exposed side of the animal;
    n) hanging the butchered loose meat portions from the assembled tripod;
    o) packaging the loose meat portions;
    p) turning the downed animal from the first side to a second side;
    q) repeating steps d) through p) for the second side.

9. The method of quartering and butchering a downed game animal in the field recited in claim 8 further comprising the steps of:
    a) placing the assembled tripod over the rear portion of the carcass and securing the rope to lift the rear portion of the carcass;
    b) using a hunting knife to remove the tender loin meat portions;

c) packaging the tender loins;

d) if so desired, placing the assembled tripod over the front portion of the carcass and securing the rope to lift the exposed rib cage if not previously removed;

e) using a hunting knife and/or saw to remove the rib cage from the carcass;

f) pulling on the rope to lift the rib cage free of the carcass; and g) packaging the rib cage.

10. A locking mechanism for telescoping tubes, the locking mechanism comprising:

a generally cylindrical insert body that is mounted in an upper end of an inner tube, such that a locking surface of the insert body is located outside of the upper end of the inner tube;

at least one ball bearing;

a ball bearing track on the locking surface of the insert body, the bearing track having an unlocked position at one end of the bearing track, flared locked positions at the other end of the bearing track, and a bump protrusion between the unlocked position and the flared locked positions; and a slide ring with a ball bearing opening that wraps around the locking surface of the insert body and holds the at least one bearing in the bearing track and in the bearing opening of the slide ring;

wherein a linear position of the upper end of the inner tube within an outer tube can be adjusted and locked into position by twisting the inner tube relative to the outer tube such that the ball bearing moves from the unlocked position over the bump protrusion in to one of the flared locked positions.

11. The locking mechanism recited in claim 10 wherein the slide ring includes one or more flaps adjacent the ball bearing opening to hold the ball bearing away from the outer tube when the locking mechanism has been turned so that the ball bearing is the unlock position in the ball bearing track.

12. The locking mechanism recited in claim 10 wherein the locking mechanism include three ball bearings, the insert body includes three ball bearing tracks spacing symmetrically around the locking surface of the insert, and the slide ring includes three ball bearing openings for holding each ball bearing in one of the tracks.

13. The locking mechanism recited in claim 10 wherein the outer tube includes a longitudinal rib along its inside surface, and the slide ring includes a detent to engage the slide ring and prevent it from rotating with respect to the outer tube.

14. The locking mechanism recited in claim 10 wherein the ball bearing track lies along a plane that is perpendicular to the longitudinal axis of the inner and outer tubes, the unlocked position in the track is along the plane and one of the flared locked positions is a first locked position and lies above the plane and the other of the flared locked positions is a second position and lies below the plane; and further wherein the ball bearing resides in the first locked position when the inner and outer tubes are twisted to lock the linear position of the upper end of the inner tube within the outer tube and to prevent the tubes from extending when a pulling force is applied to the ends of the telescoping tubes, and the ball bearing resides in the second locked position when the inner and outer tubes are twisted to lock the linear position of the upper end of the inner tube within the outer tube and to prevent the tubes from collapsing together when weight or a pushing force is applied to the ends of the telescoping tubes.

* * * * *